United States Patent
Agrawal et al.

(10) Patent No.: US 8,846,184 B2
(45) Date of Patent: Sep. 30, 2014

(54) CHROMIC LUMINESCENT OBJECTS

(71) Applicant: Performance Indicator, LLC, Lowell, MA (US)

(72) Inventors: Satish Agrawal, Concord, MA (US); Louis Cincotta, Andover, MA (US); Edward D. Kingsley, Stow, MA (US); Nancy Lane, Needham, MA (US)

(73) Assignee: Performance Indicator, Lowell, MA (US)

( * ) Notice: Subject to any disclaimer, the term of this patent is extended or adjusted under 35 U.S.C. 154(b) by 0 days.

(21) Appl. No.: 13/802,911

(22) Filed: Mar. 14, 2013

(65) Prior Publication Data

US 2013/0288075 A1 Oct. 31, 2013

Related U.S. Application Data

(60) Provisional application No. 61/637,893, filed on Apr. 25, 2012.

(51) Int. Cl.
| | |
|---|---|
| *B41M 5/00* | (2006.01) |
| *B44C 1/17* | (2006.01) |
| *G03G 7/00* | (2006.01) |
| *C09K 11/06* | (2006.01) |
| *H05B 33/14* | (2006.01) |
| *B32B 27/08* | (2006.01) |
| *B32B 3/10* | (2006.01) |
| *C09K 11/08* | (2006.01) |
| *C09K 11/02* | (2006.01) |

(52) U.S. Cl.
CPC .............. *C09K 11/06* (2013.01); *Y10S 428/917* (2013.01); *H05B 33/14* (2013.01); *B32B 27/08* (2013.01); *Y10S 428/913* (2013.01); *B32B 3/10* (2013.01); *C09K 11/08* (2013.01); *C09K 11/02* (2013.01)
USPC ... 428/195.1; 428/913; 428/917; 252/301.16; 252/301.36; 428/913

(58) Field of Classification Search
CPC .......... B32B 3/10; B32B 27/08; C09K 11/06; C09K 11/08; C09K 11/25; H05B 33/14; Y10S 428/913; Y10S 428/917
USPC .................. 428/195.1, 913, 917; 252/301.16, 252/301.36
See application file for complete search history.

(56) References Cited

U.S. PATENT DOCUMENTS

| | | | |
|---|---|---|---|
| 4,711,547 A * | 12/1987 | Iizuka | ........................... 396/287 |
| 5,144,877 A | 9/1992 | Parks | |
| 5,985,381 A | 11/1999 | Conner | |
| 6,454,966 B1 | 9/2002 | Kobayashi et al. | |
| 6,805,957 B1 | 10/2004 | Santos et al. | |

(Continued)

OTHER PUBLICATIONS

Non Final Office Action dated Apr. 10, 2014; for U.S. Appl. No. 13/483,099, filed May 30, 2012.

*Primary Examiner* — Betelhem Shewareged
(74) *Attorney, Agent, or Firm* — Cantor Colburn LLP (57) ABSTRACT

A chromic luminescent object comprising one or more chromic luminescent compositions incorporated into or onto one or more portions of the object, in which the one or more chromic luminescent compositions are selected such that, when subsequently exposed to incident electromagnetic radiation, at least brightness of the one or more portions of the object is substantially modulated through absorption and emission as a function of incident electromagnetic radiation is disclosed. Also disclosed are methods for fabricating the chromic luminescent object.

25 Claims, 5 Drawing Sheets

(56) References Cited

U.S. PATENT DOCUMENTS

2004/0220298 A1* 11/2004 Kozee et al. .......... 523/160
2009/0263644 A1 10/2009 Kelsey
2013/0288022 A1 10/2013 Agrawal et al.
2014/0103258 A1 4/2014 Agrawal et al.

* cited by examiner (A)

FIG. 5

CHROMIC LUMINESCENT OBJECTS

CROSS-REFERENCE TO RELATED APPLICATIONS

This application claims priority to U.S. Provisional Patent Application Ser. No. 61/637,893, filed Apr. 25, 2012, entitled "Chromic Luminescent Compositions," which is incorporated by reference herein in its entirety for all purposes.

BACKGROUND OF THE INVENTION

These teachings relate generally to chromic luminescent objects, and more particularly, to the preparation and use of one or more chromic luminescent compositions that are incorporated into or onto one or more portions of the object, such that brightness of the one or more portions of the object are substantially modulated as a function of incident electromagnetic radiation. In addition to brightness, the one or more chromic luminescent compositions may also afford color of the one or more portions of the object to be substantially modulated as a function of incident electromagnetic radiation. Further, frequency of the object may also be substantially altered through substantially modulated brightness alone or brightness and color of one or more adjacent portions of the object as a function of incident electromagnetic radiation.

The human eye contains two types of photoreceptors, rods and cones. The rods are more numerous, some 120 million, and perceive brightness. The cones, of which there are 6 to 7 million, provide the eye's sensitivity to color. As a consequence, given the significantly larger number of receptors that detect variations in brightness, minimizing detection of an object with any adaptive camouflage scheme should encompass the ability to vary at least brightness in addition to color. Unfortunately, today's camouflage systems do not provide a mechanism to account for varying brightness, as well as frequency and/or color if desired, so as to more effectively reduce contrast of an object as the local environment and/or terrain changes, and therefore are unable to provide optimum concealment.

Currently, the majority of color renditions onto objects are achieved by deploying absorptive-only, non-luminescent compositions. Although such absorptive-only, non-luminescent compositions can achieve a wide color gamut, these compositions are static, that is, once applied they remain the same and hence cannot change color as the incident electromagnetic radiation changes. Furthermore, as incident electromagnetic radiation changes, such compositions do not enable variations in brightness of the object or additionally, the frequency of the object. As a result, the use of these compositions is substantially limiting.

Today's camouflage systems are sophisticated combinations of colored macro and/or micro patterns, as described in U.S. Pat. No. 6,805,957, that are developed to address disruption of shape and background matching for the purpose of concealment. These systems generally use absorptive pigments that subtract a certain fraction of incident electromagnetic radiation to produce a desired reflectance value rendered as a repeat pattern so as to achieve a brightness level similar to that of the selected surrounding for which concealment is warranted. Ideally, movement of an object from a high frequency domain, such as a woodland terrain, to a low frequency domain, such as flat terrain, should be accompanied by a diminished pattern and increased brightness in order to minimize the object's contrast with the background. However, this does not occur with the current camouflage systems since, once applied, they produce a reflectance value and pattern frequency that are static, i.e. they will not change as the environment and/or terrain changes, and are therefore unlikely to be as effective throughout the 24 hr day/night cycle, as well as where different terrains are encountered. It can be appreciated that when the environment is darker the color(s) of the object should become less bright to better blend in with the surroundings and conversely, for very bright surroundings, the color(s) of the object should be brighter.

Furthermore, although there have been attempts at adaptive camouflage systems that utilize various triggers, such as those cited in U.S. Pat. Nos. 5,985,381 and 5,144,877, such technologies rely on the varying absorptive properties of dyes formed via molecular rearrangements following either sunlight exposure or temperature change to affect color change, i.e. going from a colorless or light colored state to a darker colored state. These teachings provide an additive color function on top of the base static camouflage colors and as a result, do not then have the ability to modulate brightness so as to minimize contrast.

Given the existing camouflage systems being employed onto objects, there is, therefore a need for chromic luminescent objects that utilize chromic luminescent compositions that are non-static and readily adaptable to incident electromagnetic radiation resulting from the environment or terrain for which the object is deployed. Thus, it also desirable that the chromic luminescent objects utilize chromic luminescent compositions that modulate at least brightness, or additionally modulate frequency and/or color, as a function of incident electromagnetic radiation, so that optimum concealment of the object is achieved relative to varying surrounding environments or terrains the object encounters.

BRIEF SUMMARY OF THE INVENTION

The present teachings provide for a chromic luminescent object comprising one or more chromic luminescent compositions incorporated into or onto one or more portions of the object. The one or more chromic luminescent compositions are selected such that, when subsequently exposed to incident electromagnetic radiation, brightness of the one or more portions of the object is substantially modulated through absorption and emission as a function of incident electromagnetic radiation. The incident electromagnetic radiation may emanate from at least one of a natural light source or an artificial light source. The one or more chromic luminescent compositions comprise one or more non-luminescent materials with absorption spectra that at least partially overlap with the spectrum of incident electromagnetic radiation, and one or more luminescent materials that convert at least a portion of energy of incident electromagnetic radiation to a lower energy wavelength. The one or more non-luminescent materials may comprise at least one of one or more organic non-fluorescent materials or one or more inorganic non-fluorescent materials, whereas the one or more luminescent materials may comprise at least one of one or more organic fluorescent materials or one or more inorganic fluorescent materials. In some aspects, at least one of the one or more non-luminescent materials may have an absorption spectrum that further partially overlaps with the emission spectrum of at least one of the one or more luminescent materials. In other aspects, at least one of the one or more luminescent materials may have an absorption spectrum that further at least partially overlaps with the emission spectrum of another one of the one or more luminescent materials. In some instances, the one or more chromic luminescent compositions may be further selected such that, when subsequently exposed to incident electromagnetic radiation, frequency of the object is substantially altered through substantially modulated brightness of one or more adjacent portions of the object as a function of incident electromagnetic radiation. In other instances, the one or more chromic luminescent compositions may be further selected such that, when subsequently exposed to incident electromagnetic radiation, color of the one or more portions of the object is substantially modulated through absorption and emission as a function of incident electromagnetic radiation. In these instances, the absorption spectrum of at least one of the one or more non-luminescent materials may further partially overlap with the emission spectrum of a least one of said one or more luminescent materials. Alternatively in these instances, the absorption spectrum of at least one of the one or more luminescent materials may at least partially overlap with the emission spectrum of another one of the one or more luminescent materials. In another aspect of the present teachings, the one or more chromic luminescent compositions may be further selected such that, when subsequently exposed to incident electromagnetic radiation, frequency of the object is substantially altered through substantially modulated color and brightness of one or more adjacent portions of the object as a function of incident electromagnetic radiation. In further instances, the one or more chromic luminescent compositions may further comprise at least one of one or more polymers, one or more binding agents, one or more dispersants, one or more thickeners, or one or more defoamers. In certain constructions of the present teachings, one of the one or more portions of the chromic luminescent object may comprise one of the one or more chromic luminescent compositions and another one of the one or more portions of the chromic luminescent object may comprise another one of the one or more chromic luminescent compositions. The chromic luminescent object of the present teachings may further comprise one or more substrates having the one or more chromic luminescent compositions disposed into or onto one or more portions of a surface of the one or more substrates, such that a surface of the one or more substrates is affixed to the one or more portions of the chromic luminescent object. Alternatively, the chromic luminescent object of the present teachings may further comprise one or more substrates having the one or more chromic luminescent compositions disposed into or onto one or more portions of a surface of the one or more substrates, such that a surface of the one or more substrates is transferred to the one or more portions of the chromic luminescent object. The chromic luminescent object of the present teachings may be a vehicle, an aircraft, a watercraft, weaponry, military equipment, sporting equipment, hunting equipment, or a housing structure.

The present teachings also provide for a method for fabricating an object. The method of the present teachings comprises incorporating one or more chromic luminescent compositions into or onto one or more portions of the object, the object being a chromic luminescent object. In some instances, incorporating the one or more chromic luminescent compositions into or onto the one or more portions of the object may comprise applying the one or more chromic luminescent compositions into or onto one or more portions of a surface of one or more substrates, and affixing a surface of the one or more substrates into or onto the one or more portions of the object. In other instances, incorporating the one or more chromic luminescent compositions into or onto the one or more portions of the object may comprise applying the one or more chromic luminescent compositions into or onto one or more portions of a surface of one or more substrates, and transferring a surface of the one or more substrates into or onto the one or more portions of the object. The one or more chromic luminescent compositions are selected such that, when subsequently exposed to incident electromagnetic radiation, brightness of the one or more portions of the chromic luminescent object is substantially modulated through absorption and emission as a function of incident electromagnetic radiation. The one or more chromic luminescent compositions comprise one or more non-luminescent materials with absorption spectra that at least partially overlap with the spectrum of incident electromagnetic radiation, and one or more luminescent materials that convert at least a portion of energy of incident electromagnetic radiation to a lower energy wavelength. In some instances, the one or more chromic luminescent compositions may be further selected such that, when subsequently exposed to incident electromagnetic radiation, frequency of the chromic luminescent object is substantially altered through substantially modulated brightness of one or more adjacent portions of the chromic luminescent object as a function of incident electromagnetic radiation. In other instances, the one or more chromic luminescent compositions may be further selected such that, when subsequently exposed to incident electromagnetic radiation, color of the one or more portions of the chromic luminescent object is substantially modulated through absorption and emission as a function of incident electromagnetic radiation. In another instance, the one or more chromic luminescent compositions may be further selected such that, when subsequently exposed to incident electromagnetic radiation, frequency of the chromic luminescent object is substantially altered through substantially modulated color and brightness of one or more adjacent portions of the chromic luminescent object as a function of incident electromagnetic radiation. In further instances, the one or more chromic luminescent compositions may further comprise at least one of one or more polymers, one or more binding agents, one or more dispersants, one or more thickeners, or one or more defoamers. In certain constructions of the present teachings, one of the one or more chromic luminescent compositions is applied to one of the one or more portions of the object and another one of the one or more chromic luminescent compositions is applied to another one of the one or more portions of the object. The chromic luminescent object of the present teachings may be a vehicle, an aircraft, a watercraft, weaponry, military equipment, sporting equipment, hunting equipment, or a housing structure.

BRIEF DESCRIPTION OF THE DRAWINGS

The present teachings are illustratively shown and described in reference to the accompanying drawings, in which.

DETAILED DESCRIPTION OF THE INVENTION

The present teachings are directed to a chromic luminescent object having one or more chromic luminescent compositions incorporated into or onto one or more portions (e.g. surfaces), of the object, so that brightness, or in some instances additionally color, of these one or more portions of the object can be substantially modulated as a function of incident electromagnetic radiation. Furthermore, through substantially modulated brightness, or brightness and color, frequency of the object may also be substantially altered.

For a better understanding of the disclosure, the following terms are herein defined:

"Luminescence" as used herein refers to the emission of electromagnetic radiation from any substance. Luminescence occurs from electronically excited states following excitation of the ground state of the substance by an energy source.

"Frequency" as used herein is defined as the reciprocal of the mean distance between one or more shapes and/or one or more patterns of a single or multiple colors used to mimic the surrounding environment and/or terrain and encompasses both configural information, i.e. sharp edges, fine details, etc., as well as global information about the shape, i.e. general orientation and proportions. The smaller the mean distance, the greater the frequency.

"Incident Electromagnetic Radiation" as used herein is defined as any light source, natural and/or artificial, radiating within the surrounding environment.

"Ambient Light" is term used herein synonymously with "Incident Electromagnetic Radiation," as defined above.

"Non-luminescent Material" as used herein is a material that absorbs incident electromagnetic radiation, as defined above, and does not substantially emit electromagnetic radiation subsequent to exposure to incident electromagnetic radiation.

"Luminescent Material" as used herein is a material which exhibits luminescence, as defined above. Generally speaking, a luminescent material absorbs electromagnetic radiation at a first wavelength and re-emits the radiation at a second wavelength that is longer and lower in energy than the first wavelength.

"Quantum Yield" as used herein is defined as the ratio of the photons absorbed to the photons emitted through luminescence, as defined above. Further, it is the probability of the excited state being deactivated by luminescence rather than by another non-radiative mechanism.

"Stokes Shift" is defined as the difference in wavelength between the electromagnetic radiation that is absorbed and emitted by a luminescent material, as defined above.

The following disclosure describes chromic luminescent objects, as well as the methods and the materials for creating such objects. According to the present teachings, the chromic luminescent object(s) employ the use of one or more chromic luminescent compositions that enable one or more portions (e.g. surfaces) of the object(s) to substantially change brightness only, or in addition color, through absorption and emission as a function of incident electromagnetic radiation. In addition, these chromic luminescent compositions may further substantially alter the frequency of the object(s) through substantially modulated brightness, or in some instances brightness and color, of one or more adjacent portions (e.g. surfaces) of the object(s) as a function of incident electromagnetic radiation.

In general, the one or more chromic luminescent compositions that are incorporated into or onto one or more portions of a chromic luminescent object, in accordance with the present teachings, comprise at least one or more non-luminescent materials and one or more luminescent materials. The one or more non-luminescent materials have absorption spectra that at least partially overlap with the spectrum of incident electromagnetic radiation and may include organic and/or inorganic non-fluorescent material(s). Additionally, in some instances, the absorption spectrum of at least one of the one or more non-luminescent materials may further partially overlap with the emission spectrum of at least one of the one or more luminescent materials. The one or more luminescent materials convert at least a portion of the energy of incident electromagnetic radiation to a lower energy emissive wavelength and may include organic and/or inorganic fluorescent material(s). The one or more luminescent materials are arranged in such a way as to effectively ensure efficient energy transfer so that brightness alone, or in conjunction with color, are substantially modulated through emissive light energy in response to exposure of incident electromagnetic radiation. In some instances, the absorption spectrum of at least one of the one or more luminescent materials may at least partially overlap with the emission spectrum of another one of the one or more luminescent materials. The ratio of the one or more luminescent materials to the one or more non-luminescent materials within the one or more chromic luminescent compositions are determined by the absorptive, reflective, and emissive characteristics as well as the concentration of each material, such that the one or more chromic luminescent compositions can provide the necessary requirements to produce the desired change in at least brightness, or in addition color and/or frequency, of an object to occur within a particular terrain and/or surrounding environment. It should be noted that in instances where change in color is provided by way of the one or more chromic luminescent compositions, such change may be minimal e g going from green to lighter green, while in other instances may be significant, e.g. green to brown. The one or more chromic luminescent compositions may further include materials such as, but not limited to, one or more polymers, one or more binding agents, one or more dispersants, one or more thickeners, one or more defoamers, or combinations thereof.

The one or more chromic luminescent compositions according to the present teachings can substantially reduce the contrast that exists between an object and various ambient lighting conditions by way of producing a brightness or brightness and color that is substantially similar to that of the surrounding environment and/or terrain. The one or more chromic luminescent compositions utilize the absorptive properties of the one or more non-luminescent materials together with the absorptive and emissive properties of the one or more luminescent materials to alter at least brightness while moving between low ambient light, e.g. a shaded environment, and high ambient light, e.g. an unshaded environment. Furthermore, the additional incorporation of emissive component(s), i.e. the one or more luminescent materials, with non-emissive component(s), i.e. the one or more non-luminescent materials, into the one or more chromic luminescent compositions, makes it possible not only to increase brightness, as opposed to decrease brightness which results with the use of only non-emissive components, i.e. absorptive only components, but alternatively can also further simultaneously impart a color change. The increase in brightness alone, or in conjunction with a color change, can additionally reduce the frequency of an object through the filling and/or merging of one or more adjacent portions of the object, e.g. areas of a pattern(s), etc., which in effect reduces the number of colors exhibited by the object and thus the contrast otherwise present when the object is exposed to high (bright) ambient light environments. In the instances where the one or more chromic luminescent compositions comprise more than one luminescent material, it is also possible for the luminescent moieties to engage in either energy transfer or electron transfer among each other following their absorption of light when exposed to increased ambient light levels.

Figure 1:
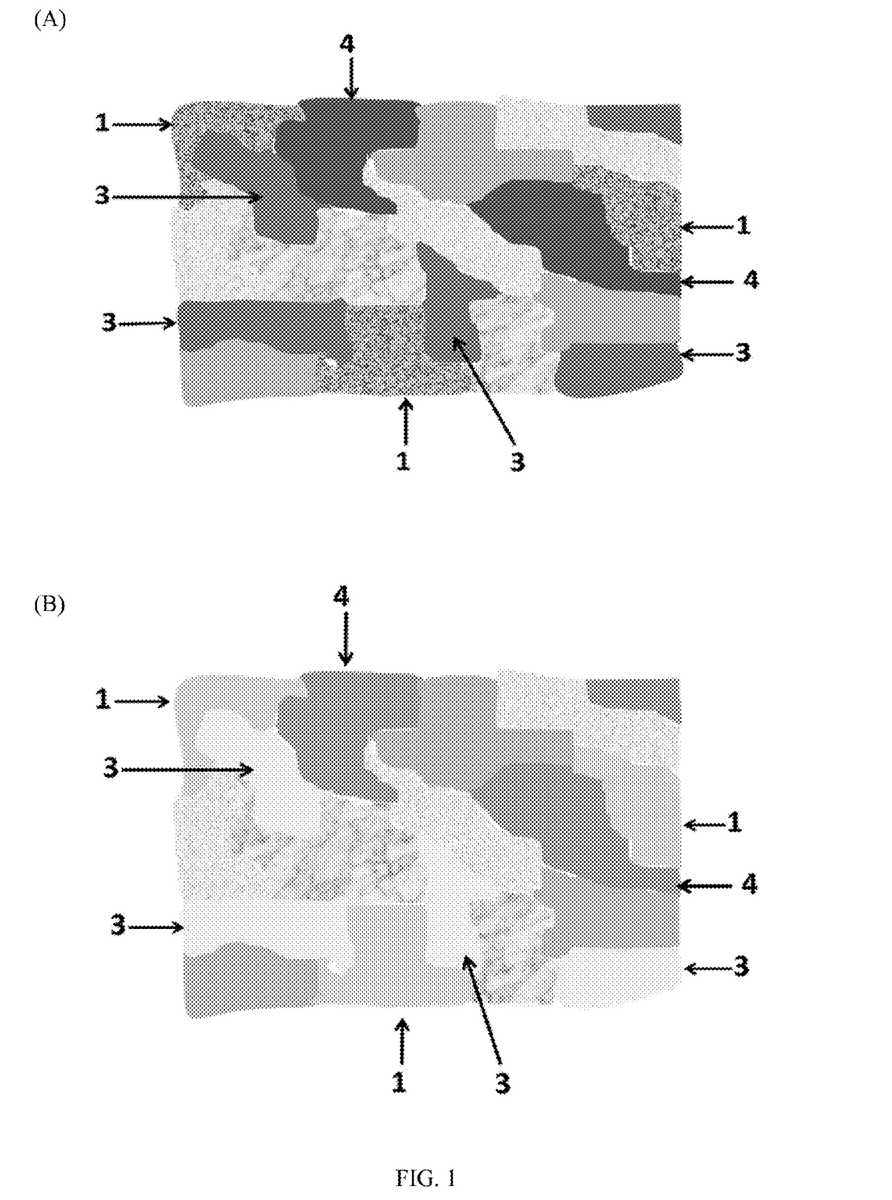
FIG. 1 illustrates a pattern with three different chromic luminescent compositions according to the present teachings, exposed to low incident electromagnetic radiation intensity (A) and high incident electromagnetic radiation intensity (B)

In one aspect of the present teachings, the combination of the one or more non-luminescent materials and the one or more luminescent materials of the one or more chromic luminescent compositions are chosen to match one or more tactical colors of a terrain for which the chromic luminescent object will be deployed such as, but not limited to, woodland, urban, desert, or combinations thereof. The one or more chromic luminescent compositions provide a brightness increase and color change as exposure to incident electromagnetic radiation increases, as well as a brightness decrease and color change as exposure to incident electromagnetic radiation decreases. For example, one or more chromic luminescent compositions within one or more portions of a pattern, can be made to exhibit one color and brightness scheme under low ambient light conditions, and as the intensity of incident electromagnetic radiation increases, the one or more chromic luminescent compositions can exhibit another color and brightness scheme, so as to reduce contrast and mimic that of the higher ambient light conditions, as illustrated in FIG. 1. FIG. 1 depicts the color and brightness scheme of a pattern having one or more chromic luminescent compositions rendered into or onto one or more portions of the pattern (1, 3, and 4). FIG. 1A illustrates the color and brightness scheme of the pattern when exposed to low ambient light levels, whereas FIG. 1B depicts another color and brightness scheme of the pattern when exposed to increased ambient light levels.

Figure 2:
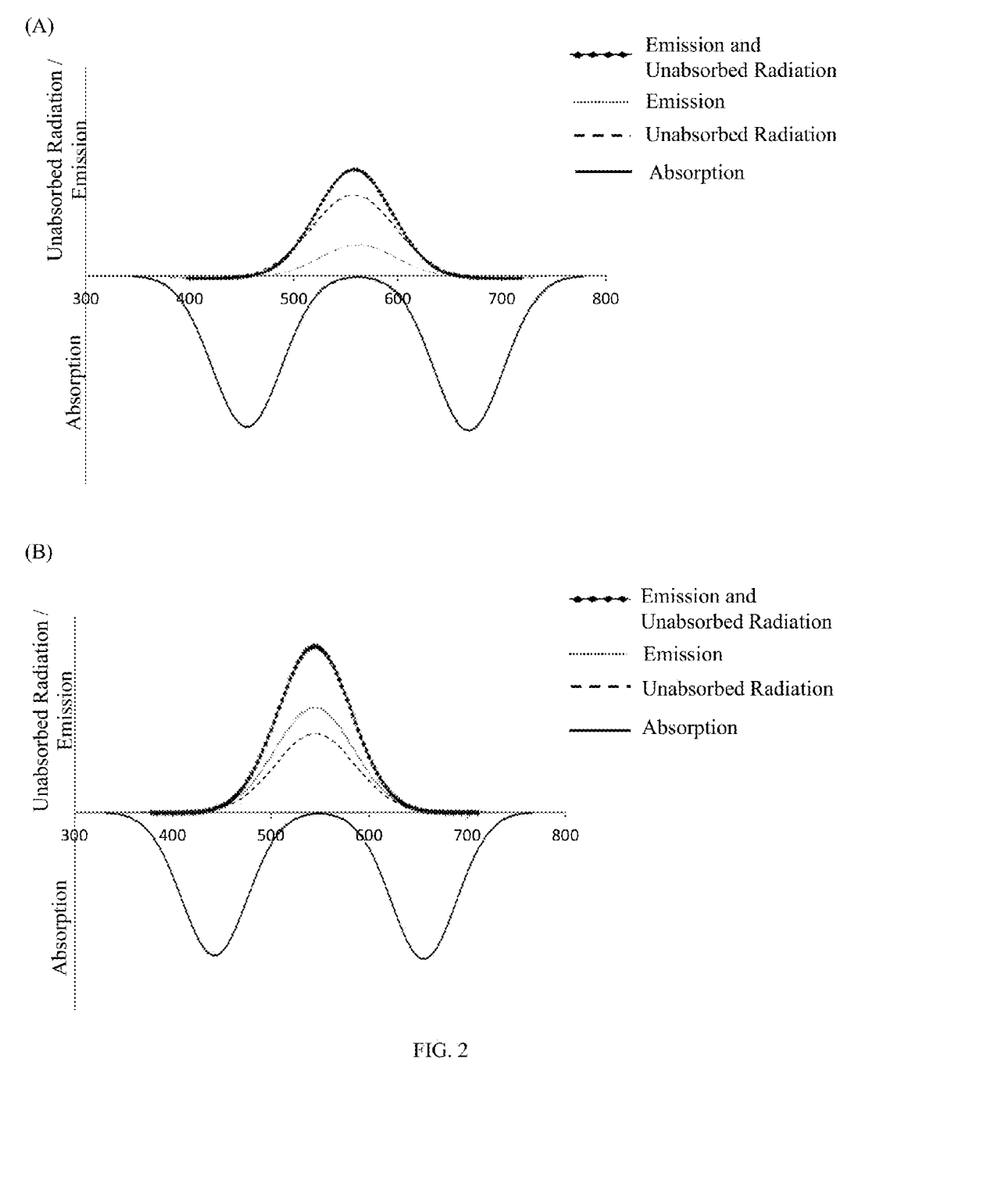
FIG. 2 is an illustrative schematic that depicts the absorption and emission behavior of one of the one or more chromic luminescent compositions, according to the present teachings, when exposed to low ambient light (A) and high ambient light (B) levels.

In the instances where the one or more chromic luminescent compositions are selected such that brightness alone is substantially modulated as a function of incident electromagnetic radiation, the emission spectrum of the one or more luminescent materials significantly, if not completely, overlaps with the unabsorbed electromagnetic radiation from the one or more non-luminescent materials, that is reflected, scattered, etc. By having the emission spectrum of the one or more luminescent materials significantly, if not completely, overlap, the color of the one or more chromic luminescent composition remains unchanged as a function of incident electromagnetic radiation. For example, FIG. 2 illustrates the absorption and emission behavior of one of the one or more chromic luminescent compositions, according to one aspect of the present teachings, when exposed to low ambient light (FIG. 2A) and when exposed to high ambient light (FIG. 2B). As illustrated in FIG. 2A, the one or more luminescent materials, when exposed to low ambient light levels, minimally emits a lower energy wavelength within the same spectrum as the unabsorbed electromagnetic radiation from the one or more non-luminescent materials, thus the defined visible brightness and color observed is a result of this nominal emitted lower energy wavelength combined with the unabsorbed electromagnetic radiation from the non-luminescent material, that is reflected, scattered, etc. On the other hand, as illustrated in FIG. 2B, the one or more luminescent materials, when exposed to increased ambient light levels, absorbs a greater amount of energy and thereby substantially emits a lower energy wavelength within the same spectrum as the unabsorbed electromagnetic radiation from the one or more non-luminescent material. As a result, the defined visible brightness increases due to the combined emitted lower energy wavelength, now significant, with the unabsorbed electromagnetic radiation, while the visible color stays the same. In addition, this differing of brightness under high ambient light levels may also result in altering the frequency of a chromic luminescent object under the same ambient light conditions by way of merging and/or filling of one or more adjacent portions of the object.

In some instances where only brightness is substantially modulated as a function of incident electromagnetic radiation, the absorption spectrum of at least one of the one or more luminescent materials may at least partially overlap with the emission spectrum of another one of the one or more luminescent materials, thereby effectively producing a greater brightness increase. In other instances, at least one of the one or more non-luminescent materials may have an absorption spectrum that further partially overlaps with the emission spectrum of at least one of the one or more luminescent materials.

In the instances where the one or more chromic luminescent compositions are selected such that both brightness and color are substantially modulated as a function of incident electromagnetic radiation, the emission spectrum of the one or more luminescent materials minimally, if at all, overlaps with the unabsorbed electromagnetic radiation from the one or more non-luminescent materials, so that the combination of the emission wavelength of the one or more luminescent materials and the unabsorbed electromagnetic radiation from the one or more non-luminescent materials, that is reflected, scattered, etc., produce a brightness and color. In instances where such one or more chromic luminescent compositions are exposed to low ambient lighting conditions, the emission wavelength of the one or more luminescent materials, now weakly emissive, in conjunction with the unabsorbed electromagnetic radiation from the one or more non-luminescent materials produce a defined color and brightness. However, when the one or more chromic luminescent compositions are exposed to increased ambient lighting levels, e.g. UV and/or visible, the one or more luminescent materials absorb a greater amount of the ambient light with the concomitant increased emission of a longer wavelength of light. This increased emission of a longer wavelength of light combines with the unabsorbed electromagnetic radiation from the one or more non-luminescent materials, that is reflected, scattered, etc., to produce an altered color and brightness via the additive combination of both the emitted wavelength and unabsorbed electromagnetic radiation. In some instances where brightness and color are substantially modulated as a function of incident electromagnetic radiation, the absorption spectrum of at least one of the one or more luminescent materials may at least partially overlap with the emission spectrum of another one of the one or more luminescent materials.

Figure 3:
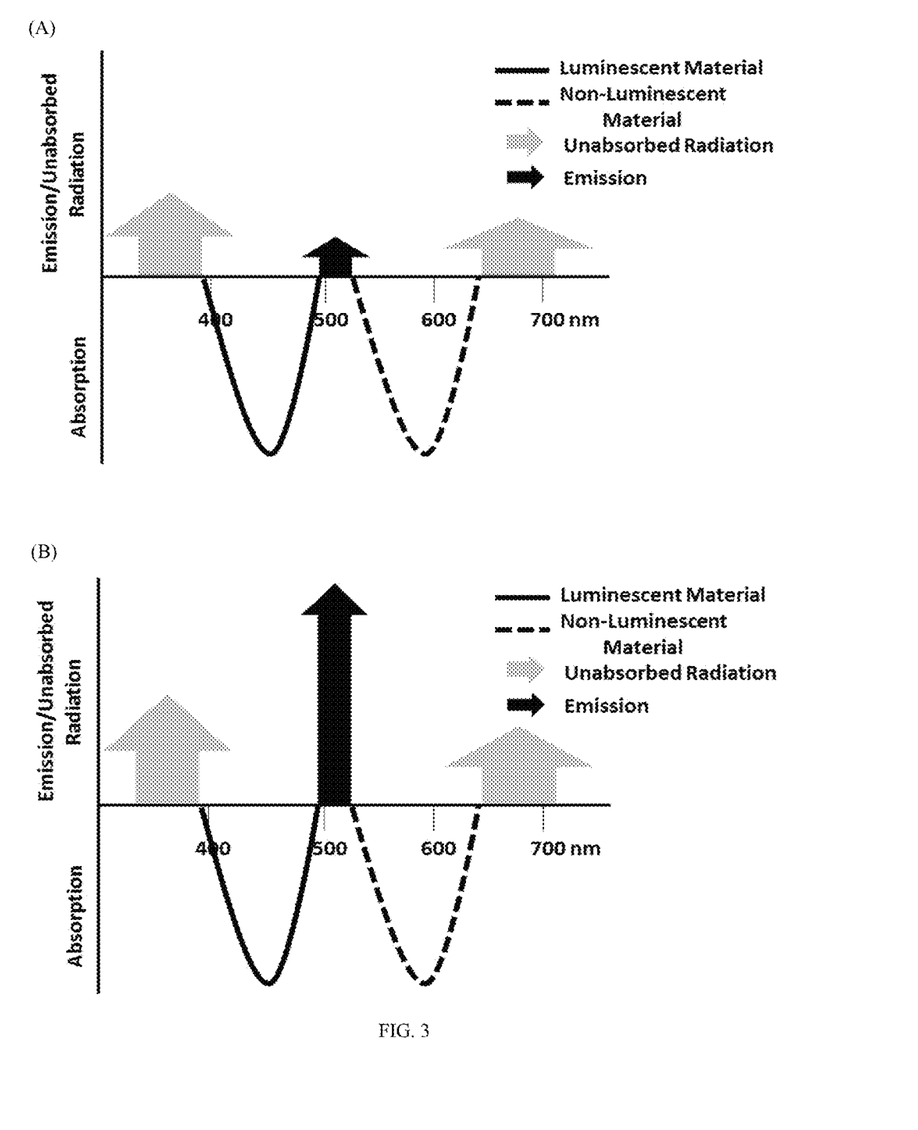
FIG. 3 is an illustrative schematic that depicts the absorption and emission behavior of another one of the one or more chromic luminescent compositions, according to the present teachings, when exposed to low ambient light (A) and high ambient light (B) levels.

FIG. 3 is a graph illustrating the absorption and emission behavior of an example of one of the one or more chromic luminescent compositions, according to the present teachings, when exposed to low ambient light (FIG. 3A) and the absorption and emission behavior of the same when exposed to high ambient light levels (FIG. 3B). In this example, the chromic luminescent composition comprises one non-luminescent material and one luminescent material. As illustrated in FIG. 3A, the luminescent material, when exposed to low ambient light levels, minimally emits a lower energy wavelength, thus the defined visible color and brightness observed is a result of this emitted lower energy wavelength combined with the unabsorbed electromagnetic radiation from the non-luminescent material, that is reflected, scattered, etc. On the other hand, as illustrated in FIG. 3B, the luminescent material, when exposed to increased ambient light levels, substantially emits a lower energy wavelength resulting in a different color and brightness that encompasses both this lower energy wavelength along with the unabsorbed electromagnetic radiation from the non-luminescent material that is reflected, scattered, etc. Thus, the observed color and brightness of the one or more chromic luminescent compositions under increased ambient light levels becomes a dissimilar color and increased brightness than that observed under low ambient light levels. In addition, this differing color and increased brightness under high ambient light levels may also result in altering the frequency of a pattern of a chromic luminescent object under the same ambient light conditions by way of, e.g., merging and/or filling of one or more adjacent portions of the pattern. In the instances where the one or more chromic luminescent compositions comprise more than one luminescent material, it is also possible for the luminescent moieties to engage in either energy transfer or electron transfer among each other following their absorption of light when exposed to increased ambient light levels.

Formulating colors using non-luminescent materials, i.e. conventional colorants, is well known to those in the art. For example, it is known that mixing a blue conventional colorant with a red conventional colorant will give a purple color. The most important parameters for consideration of formulating color using non-luminescent materials are their absorptive properties since they do not emit light. However, luminescent materials have the added quality of emission, and thus, this property must also be considered when calculating the combination of materials within the one or more chromic luminescent compositions according to the present teachings. Thus, different ratios of the one or more non-luminescent materials to the one or more luminescent materials will be utilized within each chromic luminescent composition to produce the effects necessary to yield the overall desired effect, i.e. a specific change in brightness only or brightness in conjunction with frequency and/or color. Furthermore, parameters such as, but not limited to, "Quantum Yield" and/or "Stokes Shift" will also be important in producing an appropriate brightness response, as well as frequency and/or color if desired, to changing ambient lighting conditions. It should be noted that the modulation of brightness, as well as frequency and/or color, are brought about through altered light levels and as a result, this modulation is reversible when the original lighting conditions are re-encountered.

The one or more chromic luminescent compositions, according to the present invention may be fabricated by any method well known to those skilled in the art. The one or more chromic luminescent compositions may take the form of inks, paints, coating fluids, or mini- or micro-encapsulated colorants, etc. using a wide variety of encapsulating media such as, but not limited to, silica, sol gels, ormosils, latex particles or other polymer matrices dispersed in a variety of one or more binding agents such as, but not limited to, polyurethanes, polyacrylates, polyvinyl chlorides, polyvinyl acetates, polystyrenes, or co-polymers of same. It should be noted that in some instances, the polymers and binding agents may be of the same material. In the instance where the one or more chromic luminescent compositions take the form of an ink, aqueous (latex) solutions or oil based formulations may be utilized. Alternatively, the one or more chromic luminescent compositions may be formulated in one or more polymers such as, but not limited to, polyurethanes, polyacrylates, polyvinyl chlorides, polyvinyl acetates, polystyrenes, or co-polymers of same. Additionally, a variety of inorganic encapsulation techniques are also of value including sol gel, etc. It should be noted that the choice of polymers and binding agents, if utilized within the one or more chromic luminescent compositions, should be evaluated based on their ability to adhere to the materials of an object for which the one or more chromic luminescent compositions are incorporated.

Additional components such as, e.g. one or more dispersants, one or more thickeners, one or more defoamers, or combinations thereof, may be added to the one or more chromic luminescent compositions to facilitate the dissolution/dispersion of the one or more non-luminescent materials and the one or more luminescent materials. Examples of acceptable dispersants may include, but not limited to, DISPERBYK®-180, DISPERBYK®-181, DISPERBYK®-108, all from BYK-Chemie, or TEGO® Dispers 710 from Degussa GmbH. Examples of suitable thickeners may include, but not limited to, hydrophobically modified urethanes (HEUR) such as Acrysol RM-845, acrylates, carboxymethyl cellulose (CMC), silicates, or hydroxyethyl cellulose (HEC). Examples of suitable defoamers may include, but not limited to, organic modified polysiloxanes such as TEGO® Airex900 or silicone types such as Noresil S-900.

Figure 4:
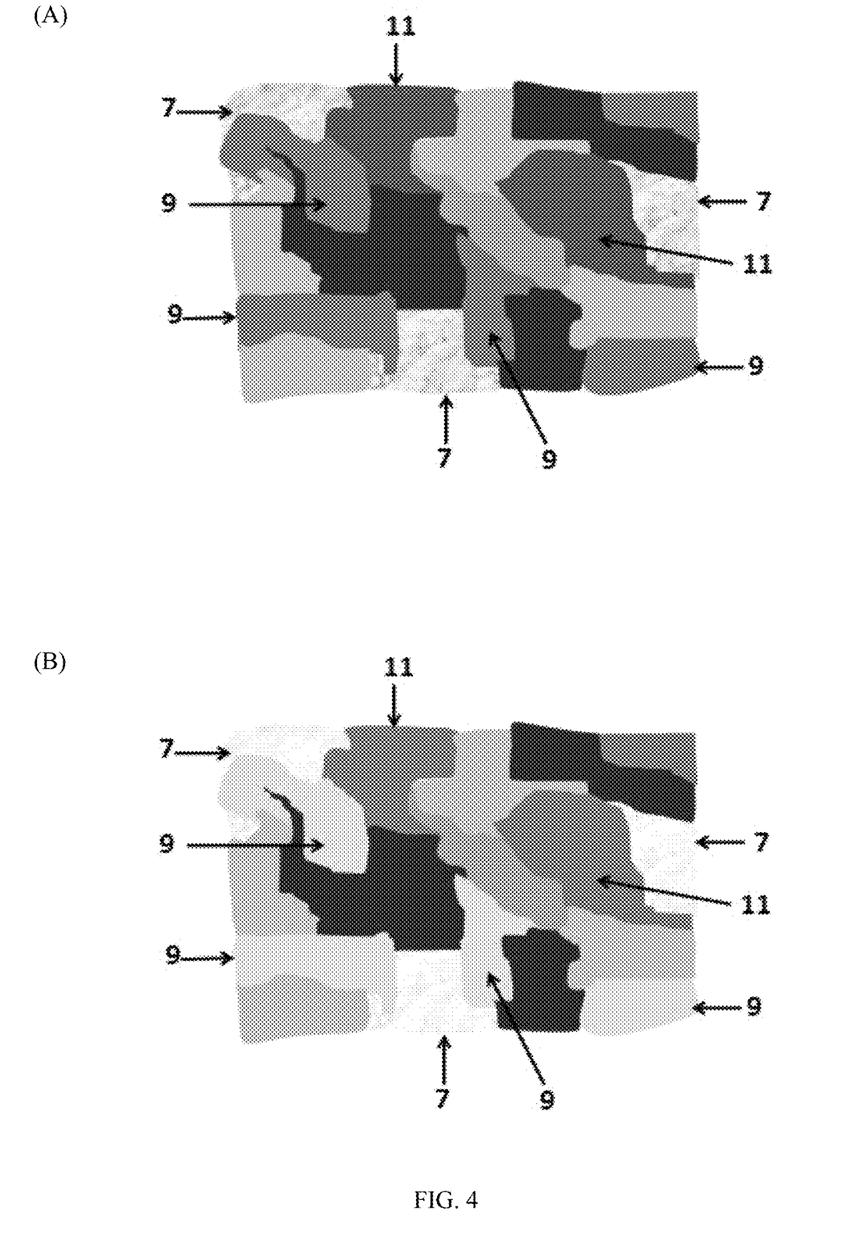
FIG. 4. illustrates a planar view of a section of a chromic luminescent object, according to one aspect of the present teachings, exposed to low incident electromagnetic radiation intensity (A) and high incident electromagnetic radiation intensity (B)

In accordance with the present teachings, the one or more chromic luminescent compositions described herein and above are incorporated into or onto one or more portions of a chromic luminescent object, such that brightness of the one or more portions of the object can be substantially modulated as a function of incident electromagnetic radiation in order to mimic the incident electromagnetic radiation resulting from the environment and/or terrain for which the object is exposed. The one or more chromic luminescent compositions may be further selected so that, in addition to brightness, color of the one or more portions of the object can also be substantially modulated as a function of incident electromagnetic radiation. For example, FIG. 4 depicts a planar view of a section of chromic luminescent object according to one aspect of the present teachings in which one chromic luminescent composition 7 is incorporated into or onto one or more portions of the object, a second chromic luminescent composition 9 is incorporated into or onto another one or more portions of the object, a third luminescent composition 11 is incorporated into or onto another one or more portions of the object, and static, conventional colorants are incorporated within the remaining portions of the object. FIG. 4A illustrates the brightness and color scheme of the section of the chromic luminescent object when exposed to low incident electromagnetic radiation, whereas FIG. 4B illustrates the brightness and color scheme of the same section of the chromic luminescent object exposed to high incident electromagnetic radiation. In an alternative aspect of the present teachings, the chromic luminescent object may also comprise one or more substrates having the one or more chromic luminescent compositions disposed into or onto one or more portions of a surface of the one or more substrates and a surface of the one or more substrates is affixed or transferred to the one or more portions of the object.

Figure 5:
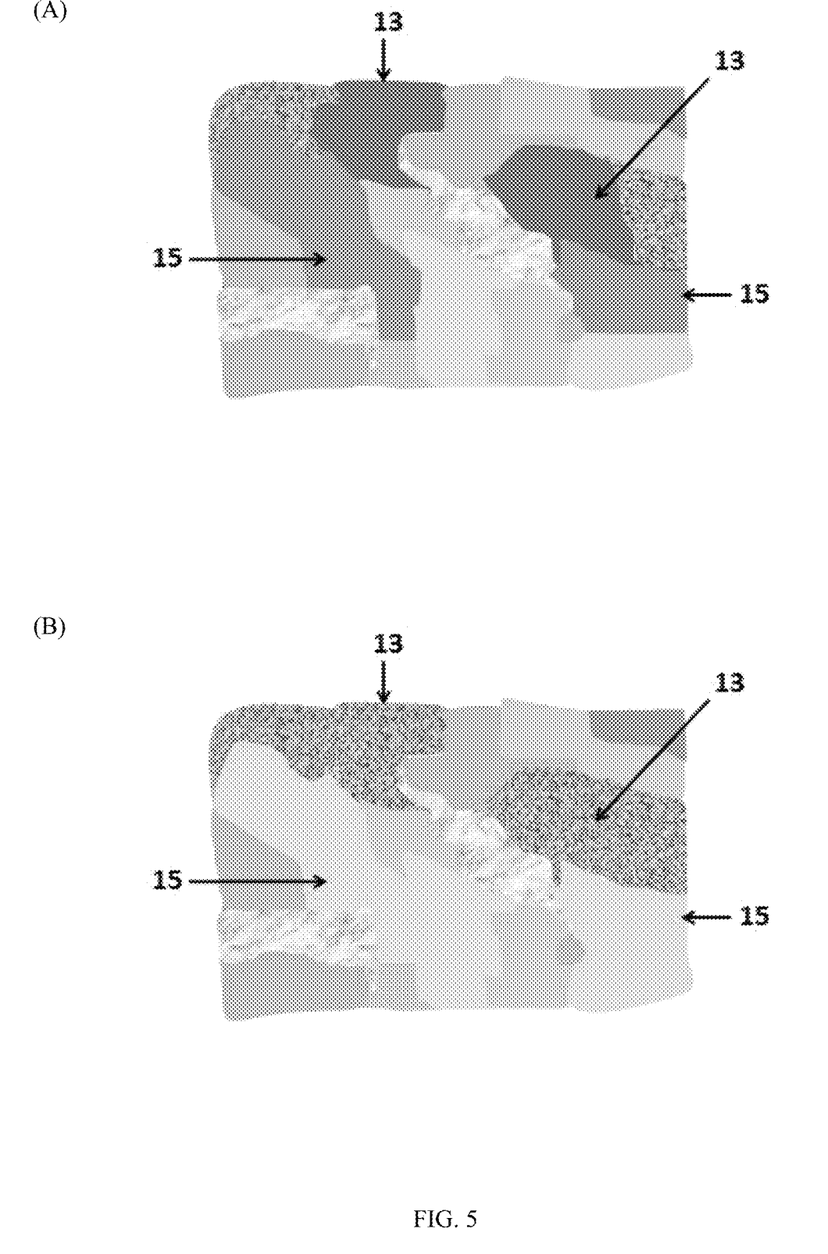
FIG. 5 illustrates a planar view of a section of a chromic luminescent object, according to another aspect of the present teachings, exposed to low incident electromagnetic radiation intensity (A) and high incident electromagnetic radiation intensity (B).

In a further aspect of the present teachings the one or more chromic luminescent compositions described herein and above may also be incorporated into or onto one or more portions of a chromic luminescent object, such that frequency of the object is substantially altered through either substantially modulated brightness or brightness and color of one or more adjacent portions of the object as a function of incident electromagnetic radiation. For example, FIG. 5 depicts a planar view of a section of chromic luminescent object according to another aspect of the present teachings in which one chromic luminescent composition 13 is incorporated into or onto one or more portions of the object, a second chromic luminescent composition 15 is incorporated into or onto another one or more portions of the object, and static, conventional colorants are incorporated within the remaining portions of the object. FIG. 5A illustrates the section of the chromic luminescent object exposed to low incident electromagnetic radiation, whereas FIG. 5B illustrates the same section of the chromic luminescent object exposed to high incident electromagnetic radiation. Thus, frequency of the object, as a result of substantially modulated brightness, or brightness and color, of one or more adjacent portions of the object as a function of incident electromagnetic radiation, can be substantially altered thereby reducing the number of brightness and/or color changes that exist between the object and its surrounding environment and/or terrain under varying lighting conditions.

The chromic luminescent object, according to the present teachings, may be fabricated by any method well known to those skilled in the art, e.g. incorporating the one or more chromic luminescent compositions into or onto one or more portions of the object. Alternatively, incorporating the one or more chromic luminescent compositions into or onto one or more portions of the object may include applying the one or more chromic luminescent compositions to one or more portions of a surface of one or more substrates and then affixing or transferring, e.g. chemically, thermally, or mechanically, a surface of the one or more substrates to the one or more portions of the object. Examples of suitable substrates may include, but not limited to, polyesters, PVCs, polycarbonates, polyurethanes, polyacrylates, etc. In either case, incorporating the one or more chromic luminescent compositions may be performed by way of techniques such as, but not limited to, screen printing, painting, spraying, dip coating, slot coating, roller coating, bar coating, extrusion, or by way of transferring, i.e. coating the composition onto a surface of a temporary substrate for which such surface is then applied to either one or more portions of the object or a surface of one or more substrates and the temporary substrate is subsequently removed.

By incorporating the one or more chromic luminescent compositions into or onto one or more portions of the chromic luminescent object, e.g. completely throughout or specific portion(s), it is possible to create a variety of desirable camouflage effects throughout the object, i.e. modulation of brightness only or in conjunction with frequency and/or color, following exposure to varying ambient light intensities. Thus, different areas of the chromic luminescent object may have different one or more chromic luminescent compositions that change brightness or brightness and color in order to create the appropriate overall effect of the chromic luminescent object. Furthermore, if desired, this change in brightness, or brightness and color, may substantially alter frequency of the chromic luminescent object as a result of, for example, the merging and/or filling of portions of an existing pattern of the object.

It should be noted it is not necessary for every region (e.g. surface) of the chromic luminescent object, according to the present teachings, to exhibit all of the variations in brightness or brightness and color. In other words, it is possible to have one portion of the object exhibit a specific color and brightness change, another portion exhibit a specific brightness change, while having another area of the object remain static. Furthermore, another portion of the object may undergo an alteration in frequency as a result of one or more of these changes, i.e. the specific color and brightness change, the brightness change only, or combinations thereof, of one or more adjacent portions of the object. Thus, one or more regions throughout the chromic luminescent object may behave differently and/or concurrently in order to produce the overall desired effect of the object.

Chromic luminescent objects of the present teachings are applicable to a wide range of applications where visual signature reduction may be needed, such as in the consumer, industrial, or military sectors. Examples of such chromic luminescent objects may include, but not limited to, a vehicle, an aircraft, a watercraft, weaponry, military equipment, sporting equipment, hunting equipment, or a housing structure. In addition, such chromic luminescent objects may be utilized for aesthetic purposes in areas such as, but not limited to, fashion, cosmetics, or decorative markets. Moreover, the ability to change the visual appearance, that is brightness, and if desired frequency and/or color, of an object such as accent stripes or entire regions of the object, as the ambient light changes, can have substantial commercial appeal.

EXEMPLIFICATIONS

The present teachings, having been generally described, will be more readily understood by reference to the following examples, which are included merely for the purposes of illustration of certain aspects and embodiments of the present teachings, and are not intended to limit the scope of these teachings.

Example 1

Preparation of a Chromic Luminescent Composition Comprising One Non-Luminescent Material and One Luminescent Material Dispersion A: A 0.20% dispersion of a yellow luminescent material, TerasilFlavin 10GFF (Huntsman, $\lambda_{max}$=450 nm; $\epsilon_{max}$=505 nm), in a binder, Permax 232 (Lubrizol), was prepared by adding 0.100 g of the yellow luminescent material to a mortar followed by the addition of 1.00 g of a dispersant, Pluronic 10R5 (Sigma-Aldrich). This mixture was then ground with a pestle until a uniform dispersion resulted. Thereafter, 50.0 g of Permax 232 was gradually added to the mixture. The mixture was then subsequently ground until a uniform dispersion resulted. This mixture was then placed in a sonicator, Branson 2200, for 15 minutes at a temperature of 40° C. with occasional swirling by hand.

Dispersion B: A 5.0% dispersion of a non-luminescent material, ORCOBRITE Pigment Violet 4BN concentrate (Organic Dyestuffs Corp., $\lambda_{max}$=560 nm), was prepared by adding 5.00 g of the non-luminescent material to 95.0 g of a binder, Permax 232 (Lubrizol), and then placing this mixture in a sonicator, Branson 2200, for 15 minutes at a temperature of 40° C. with occasional swirling by hand until a uniform dispersion results.

To Dispersion A, 12.5 g of Dispersion B was added and then sonicated at a temperature of 40° C. for 15 minutes until a uniform dispersion resulted to yield a chromic luminescent composition to then be incorporated into or onto one or more portions of an object, the object being a chromic luminescent object, in accordance with the present teachings.

Example 2

Preparation of a Chromic Luminescent Composition Comprising Two Non-Luminescent Materials and One Luminescent Material Dispersion C: 9.0 g of a 0.20% dispersion of a blue non-luminescent material, Solvent Blue 38 (Sigma-Aldrich, $\lambda_{max}$=675 nm), in a binder, Permax 232 (Lubrizol), was prepared by adding 0.10 g of the blue non-luminescent material to a mortar followed by the addition of 1.00 g of a dispersant, Pluronic 10R5. This mixture was then ground with a pestle until a uniform dispersion resulted. Thereafter, 50.0 g of Permax 232 was gradually added to the mixture. The mixture was then subsequently ground until a uniform dispersion resulted. This mixture was then placed in a sonicator, Branson 2200, for 15 minutes at a temperature of 40° C. with occasional swirling by hand.

Dispersion C was added to Dispersion A and 12.5 g Dispersion B, as prepared in Example 1, and sonicated at a temperature of 40° C. for 15 minutes until a uniform dispersion resulted to yield a chromic luminescent composition to then be incorporated into or onto one or more portions of an object, the object being a chromic luminescent object, in accordance with the present teachings.

Example 3

Preparation of a Chromic Luminescent Composition Comprising Two Non-Luminescent Materials and Two Luminescent Materials Dispersion D: A 20.0% dispersion of a non-luminescent material, ORCObrite Pigment Violet 4BN concentrate (Organic Dyestuffs Corp., $\lambda_{max}$=560 nm), was prepared by adding 5.00 g of the non-luminescent material to 20.0 g of a binder, Permax 232 (Lubrizol), and then placed in a sonicator, Branson 2200, for 15 minutes at a temperature of 40° C. with occasional swirling by hand until a uniform dispersion results.

Dispersion E: A 20.0% dispersion of a non-luminescent material, ORCObrite Pigment Blue 3GN (Organic Dyestuffs Corp.), was prepared by adding 5.00 g of the non-luminescent material to 20.0 g of a binder, Permax 232 (Lubrizol), and placed in a sonicator, Branson 2200, for 15 minutes at a temperature of 40° C. with occasional swirling by hand until a uniform dispersion results.

Dispersion F: 0.175 g of a yellow luminescent material, Lumogen F083 (BASF), 7.50 g of a dispersant, Polysorbate 85 (Chemical Connection), 0.088 g of a blue luminescent material, Eutex OB (Charkit), and 0.25 g of a rheology additive, Byk 425 (BYK), were placed in a mortar and ground with a pestle until a fine dispersion was achieved. During grinding, 250.0 g of a binder, Permax 232 (Lubrizol), was added slowly. This mixture was then placed in a sonicator, Branson 2200, for 15 minutes at a temperature of 40° C. with occasional swirling by hand until a uniform dispersion was achieved. After which 0.750 g of Dispersion D and 0.50 g of Dispersion E was added to 50.0 g of Dispersion F. This mixture was then ground and sonicated at a temperature of 40° C. for 15 minutes until a uniform dispersion was achieved to yield a chromic luminescent composition to then be incorporated into or onto one or more portions of an object, the object being a chromic luminescent object, in accordance with the present teachings.

For the purposes of describing and defining the present teachings, it is noted that the term "substantially" is utilized herein to represent the inherent degree of uncertainty that may be attributed to any quantitative comparison, value, measurement or other representation. The term "substantially" is also utilized herein to present the degree by which a quantitative representation may vary from a stated reference without resulting in a change in the basic function of the subject matter at issue.

Although the teachings have been described with respect to various embodiments, it should be realized that these teachings are also capable of a wide variety of further and other embodiments within the spirit and scope of the appended disclosure.

What is claimed is:

1. A chromic luminescent object, said object comprising:
   one or more chromic luminescent compositions incorporated into or onto one or more portions of said object, said one or more chromic luminescent compositions comprising:
   (i) one or more non-luminescent materials with absorption spectra that at least partially overlap with the spectrum of incident electromagnetic radiation, and
   (ii) one or more luminescent materials that convert at least a portion of energy of incident electromagnetic radiation to a lower energy wavelength,
   wherein said one or more chromic luminescent compositions being selected such that, when subsequently exposed to incident electromagnetic radiation, brightness of said one or more portions of said object is substantially modulated through absorption and emission as a function of incident electromagnetic radiation.

2. The chromic luminescent object of claim 1, wherein the absorption spectrum of at least one of said one or more non-luminescent materials further partially overlaps with the emission spectrum of at least one of said one or more luminescent materials.

3. The chromic luminescent object of claim 1, wherein the absorption spectrum of at least one of said one or more luminescent materials at least partially overlaps with the emission spectrum of another one of said one or more luminescent materials.

4. The chromic luminescent object of claim 1, wherein said one or more chromic luminescent compositions being further selected such that, when subsequently exposed to incident electromagnetic radiation, frequency of said object is substantially altered through substantially modulated brightness of one or more adjacent portions of said object as a function of incident electromagnetic radiation.

5. The chromic luminescent object of claim 1, wherein said one or more chromic luminescent compositions being further selected such that, when subsequently exposed to incident electromagnetic radiation, color of said one or more portions of said object is substantially modulated through absorption and emission as a function of incident electromagnetic radiation.

6. The chromic luminescent object of claim 5, wherein the absorption spectrum of at least one of said one or more non-luminescent materials further partially overlaps with the emission spectrum of at least one of said one or more luminescent materials.

7. The chromic luminescent object of claim 5, wherein the absorption spectrum of at least one of said one or more luminescent materials at least partially overlaps with the emission spectrum of another one of said one or more luminescent materials.

8. The chromic luminescent object of claim 1, wherein said one or more chromic luminescent compositions being further selected such that, when subsequently exposed to incident electromagnetic radiation, frequency of said object is substantially altered through substantially modulated color and brightness of one or more adjacent portions of said object as a function of incident electromagnetic radiation.

9. The chromic luminescent object of claim 1, wherein said one or more non-luminescent materials comprise at least one of one or more organic non-fluorescent materials or one or more inorganic non-fluorescent materials.

10. The chromic luminescent object of claim 1, wherein said one or more luminescent materials comprise at least one of one or more organic fluorescent materials or one or more inorganic fluorescent materials.

11. The chromic luminescent object of claim 1, wherein one of said one or more portions of said object comprises one of said one or more chromic luminescent compositions and another one of said one or more portions of said object comprises another one of said one or more chromic luminescent compositions.

12. The chromic luminescent object of claim 1, further comprising one or more substrates having said one or more chromic luminescent compositions disposed into or onto one or more portions of a surface of said one or more substrates, such that a surface of said one or more substrates is affixed to said one or more portions of said object.

13. The chromic luminescent object of claim 1, further comprising one or more substrates having said one or more chromic luminescent compositions disposed into or onto one or more portions of a surface of said one or more substrates, such that a surface of said one or more substrates is transferred to said one or more portions of said object.

14. The chromic luminescent object of claim 1, wherein said one or more chromic luminescent compositions further comprise at least one of one or more polymers, one or more binding agents, one or more dispersants, one or more thickeners, or one or more defoamers.

15. The chromic luminescent object of claim 1, wherein incident electromagnetic radiation emanates from at least one of a natural light source or an artificial light source.

16. The chromic luminescent object of claim 1, wherein said object is a vehicle, an aircraft, a watercraft, weaponry, military equipment, sporting equipment, hunting equipment, or a housing structure.

17. A method for fabricating an object, said method comprising:
    incorporating one or more chromic luminescent compositions into or onto one or more portions of the object, the object being a chromic luminescent object, said one or more chromic luminescent compositions comprising:
        (i) one or more non-luminescent materials with absorption spectra that at least partially overlap with the spectrum of incident electromagnetic radiation, and
        (ii) one or more luminescent materials that convert at least a portion of energy of incident electromagnetic radiation to a lower energy wavelength,
    wherein said one or more chromic luminescent compositions being selected such that, when subsequently exposed to incident electromagnetic radiation, brightness of said one or more portions of said chromic luminescent object is substantially modulated through absorption and emission as a function of incident electromagnetic radiation.

18. The method of claim 17, wherein said one or more chromic luminescent compositions being further selected such that, when subsequently exposed to incident electromagnetic radiation, frequency of said chromic luminescent object is substantially altered through substantially modulated brightness of one or more adjacent portions of said chromic luminescent object as a function of incident electromagnetic radiation.

19. The method of claim 17, wherein said one or more chromic luminescent compositions being further selected such that, when subsequently exposed to incident electromagnetic radiation, color of said one or more portions of said chromic luminescent object is substantially modulated through absorption and emission as a function of incident electromagnetic radiation.

20. The method of claim 17, wherein said one or more chromic luminescent compositions being further selected such that, when subsequently exposed to incident electromagnetic radiation, frequency of said chromic luminescent object is substantially altered through substantially modulated color and brightness of one or more adjacent portions of said chromic luminescent object as a function of incident electromagnetic radiation.

21. The method of claim 17, wherein one of said one or more chromic luminescent compositions is applied to one of said one or more portions of the object and another one of said one or more chromic luminescent compositions is applied to another one of said one or more portions of the object.

22. The method of claim 17, wherein said one or more chromic luminescent compositions further comprise at least one of one or more polymers, one or more binding agents, one or more dispersants, one or more thickeners, or one or more defoamers.

23. The method of claim 17, wherein incorporating said one or more chromic luminescent compositions into or onto said one or more portions of the object comprises:
    applying said one or more chromic luminescent compositions into or onto one or more portions of a surface of one or more substrates, and
    affixing a surface of said one or more substrates into or onto said one or more portions of the object.

24. The method of claim 17, wherein incorporating said one or more chromic luminescent compositions into or onto said one or more portions of the object comprises:
    applying said one or more chromic luminescent compositions into or onto one or more portions of a surface of one or more substrates, and
    transferring a surface of said one or more substrates into or onto said one or more portions of the object.

25. The method of claim 17, wherein said chromic luminescent object is a vehicle, an aircraft, a watercraft, weaponry, military equipment, sporting equipment, hunting equipment, or a housing structure.

* * * * *